United States Patent
Calder et al.

(10) Patent No.: US 10,318,390 B2
(45) Date of Patent: Jun. 11, 2019

(54) AUTOMATED STORAGE TARGET SELECTION FOR DATA BACKUP

(71) Applicant: INTERNATIONAL BUSINESS MACHINES CORPORATION, Armonk, NY (US)

(72) Inventors: Errol J. Calder, Vail, AZ (US); Trent T. Cooper, Tucson, AZ (US); James J. Fagan, Tucson, AZ (US); Richard T. Solsten, III, Tucson, AZ (US); Forrest E. Townsend, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 13 days.

(21) Appl. No.: 15/206,147

(22) Filed: Jul. 8, 2016

(65) Prior Publication Data
US 2018/0011643 A1 Jan. 11, 2018

(51) Int. Cl.
*G06F 11/14* (2006.01)

(52) U.S. Cl.
CPC ...... *G06F 11/1458* (2013.01); *G06F 11/1456* (2013.01)

(58) Field of Classification Search
CPC ......... G06F 3/0619; G06F 3/065; G06F 3/067
See application file for complete search history.

(56) References Cited

U.S. PATENT DOCUMENTS

| 8,140,791 | B1* | 3/2012 | Greene .............. G06F 11/1464 711/162 |
| 8,868,859 | B2 | 10/2014 | Schmidt et al. |
| 8,935,366 | B2 | 1/2015 | Mehr et al. |
| 9,122,642 | B2 | 9/2015 | Chavda et al. |

(Continued)

OTHER PUBLICATIONS

"Cloud Storage Price Comparison", [online][retrieved Apr. 4, 2016], pp. 3, https://www.cloudorado.com/cloud_storage_comparison.jsp.
"Hypertext Transfer Protocol", Wikipedia, [online][retrieved Jun. 17, 2016]. pp. 11, https://en.wikipedia.org/wiki/Hypertext_Transfer_Protocol.

(Continued)

*Primary Examiner* — Edward J Dudek, Jr.
(74) *Attorney, Agent, or Firm* — William K. Konrad; Konrad Raynes Davda & Victor LLP

(57) ABSTRACT

In one embodiment, automated storage target selection includes automatically selecting a storage node of a plurality of candidate storage nodes as a function of a plurality of selection criteria. Further, a backup data object is transmitted to the selected storage node. In one embodiment, selecting a storage node includes retrieving stored user-defined parameters for selection criteria for selecting a storage node, retrieving storage node-defined parameters for selection criteria, comparing user-defined parameters and storage node-defined parameters, and selecting a storage node as a function of the comparing. In another aspect of the present description, comparing user-defined parameters and storage node-defined parameters includes broadening a first user-defined parameter to a second user-defined parameter broader than the first user-defined parameter if no candidate storage nodes have a storage node-defined parameter within the first user-defined parameter. Other features and aspects may be realized, depending upon the particular application.

24 Claims, 9 Drawing Sheets

(56) References Cited

U.S. PATENT DOCUMENTS

| | | | |
|---|---|---|---|
| 2005/0081006 A1* | 4/2005 | Shackelford | G06F 11/2069 711/162 |
| 2008/0082777 A1* | 4/2008 | Sakaguchi | G06F 3/0605 711/170 |
| 2014/0064080 A1 | 3/2014 | Stevens et al. | |
| 2015/0127770 A1* | 5/2015 | Dimmler | H04L 67/1097 709/217 |

OTHER PUBLICATIONS

K. Sowmya, et al., "Strategic bidding for Cloud resources under Dynamic Pricing schemes", 2012 International Symposium on Cloud and Services Computing, IEEE, 2012, pp. 6.

A. Luntovskyy, et al., "RAICs as Advanced Cloud Backup Technology in Telecommunication Networks", Telecommunication Sciences, 2012, vol. 3, No. 2, National Technical University of Ukraine "Kyiv Polytechnic Institute", pp. 9.

R. Kumar, et al., "Comparison between Cloud Computing, Grid Computing, Cluster Computing and Virtualization", International Journal of Modern Computer Science and Applications (IJMCSA) vol. No. 3, Issue No. 1, Jan. 2015, pp. 6.

J. Abinaya, et al., "Resource Procurement Mechanism Scheme with E-Duplication for Cloud Computing", International Journal for Research in Emerging Science and Technology, vol. 2, Issue-5, May 2015, pp. 8.

A. Andrzejak, et al., "Decision Model for Cloud Computing under LSA Constraints", 2010 18th Annual IEEE/ACM International Symposium on Modeling, Analysis and Simulation of Computer and Telecommunication Systems, pp. 10.

\* cited by examiner

| User | Data Set | Security Rating | Retrieval Time | Durability Level | Usage | Current Backup Location | Candidate Pool |
|---|---|---|---|---|---|---|---|
| U1 | D1 | SR2 | Moderate | Medium | Read | P1 | P1, P2, P3, P4, P5 ... Pn |
| U1 | D2 | SR5 | Moderate | Medium | Write | P4 | P1, P2, P3, P4, P5 ... Pn |
| U2 | D3 | SR2 | Fast | Medium | Even | P1 | P1, P2, P3, P4, P5 ... Pn |
| U2 | D4 | SR2 | Moderate | High | Even | P2 | P1, P2, P3, P4, P5 ... Pn |

FIG. 4A

| Provider | Security Rating | Retrieval Time | Durability Level |
|---|---|---|---|
| P1 | SR3 | Moderate | Medium |
| P2 | SR1 | Moderate | Medium |
| P3 | SR3 | Slow | Medium |
| P4 | SR3 | Moderate | Medium |
| P5 | SR4 | Moderate | Low |
| Pn | SR4 | Moderate | Medium |

FIG. 4B

| Provider | Put Requests | Post Requests | Get Requests | Delete Requests | Head Requests |
|---|---|---|---|---|---|
| P1 | $PutReq1 | $PostReq1 | $GetReq1 | $DelReq1 | $HeadReq1 |
| P2 | $PutReq2 | $PostReq2 | $GetReq2 | $DelReq2 | $HeadReq2 |
| P3 | $PutReq3 | $PostReq3 | $GetReq3 | $DelReq3 | $HeadReq3 |
| P4 | $PutReq4 | $PostReq4 | $GetReq4 | $DelReq4 | $HeadReq4 |
| P5 | $PutReq5 | $PostReq5 | $GetReq5 | $DelReq5 | $HeadReq5 |
| Pn | $PutReqN | $PostReqN | $GetReqN | $DelReqN | $HeadReqN |

FIG. 4C

| Provider | Upload Bandwidth Cost | Download Bandwidth Cost | Storage Cost | Data In | Data Out |
|---|---|---|---|---|---|
| P1 | $UpBand1 | $DownBand1 | $Storage1 | $DataIn1 | $DataOut1 |
| P2 | $UpBand2 | $DownBand2 | $Storage2 | $DataIn2 | $DataOut2 |
| P3 | $UpBand3 | $DownBand3 | $Storage3 | $DataIn3 | $DataOut3 |
| P4 | $UpBand4 | $DownBand4 | $Storage4 | $DataIn4 | $DataOut4 |
| P5 | $UpBand5 | $DownBand5 | $Storage5 | $DataIn5 | $DataOut5 |
| Pn | $UpBandN | $DownBandN | $StorageN | $DataInN | $DataOutN |

FIG. 4D

AUTOMATED STORAGE TARGET SELECTION FOR DATA BACKUP

BACKGROUND

1. Field

The present invention relates to a computer program product, system, and method for backing up data to storage.

2. Description of the Related Art

To prevent unintended loss of data, a copy of the data, often referred to as a "backup copy" of the data is frequently made and stored in a suitable data storage device. The backup copy may be treated as a data object and tracked in a database management system which may identify where the data object is stored, the date the copy was made and other details concerning the backup operation which created the backup copy.

There are various techniques for backing up data. For example, a full copy may be made of the entire set of data to be backed up. An "incremental" copy may be made which just copies the changes in the data since the last backup operation directed to the particular set of data. A "differential" copy may be made which just copies the changes made since the last full copy of the particular set of data was made. There may be other backup techniques utilized depending upon the needs of the particular user.

The backup operation is typically performed by a backup application or program which may perform various types of backup operations on a set schedule or in response to various events. The backup application makes an appropriate copy of the data to be backed up and transmits it to a suitable storage device (the "target" storage device) which has been selected by the user. Thus, the user typically manually enters into the backup program, the identity such as the address of the target storage device for backup operations to be performed by the program.

The target storage device is frequently connected by a network to the source of the data to be backed up and therefore may be referred to as a storage node. Such storage nodes may be part of a data processing system maintained by the owner of the data to be backed up. Alternatively, internet-connected storage nodes, often referred to as "cloud storage" are frequently owned and operated by third parties, referred to as cloud storage providers.

SUMMARY

Automated storage target selection in one aspect of the present description, includes methods and apparatus configured for automatically selecting a storage node of a plurality of candidate storage nodes as a function of a plurality of selection criteria, to identify a selected storage node. Further, a backup data object is transmitted to the selected storage node.

In one embodiment, selecting a storage node includes retrieving stored user-defined parameters for selection criteria for selecting a storage node, retrieving storage node-defined parameters for selection criteria, comparing user-defined parameters and storage node-defined parameters, and selecting a storage node as a function of the comparing. In another aspect of the present description, comparing user-defined parameters and storage node-defined parameters includes broadening a first user-defined parameter to a second user-defined parameter broader than the first user-defined parameter if no candidate storage nodes have a storage node-defined parameter within the first user-defined parameter.

In yet another aspect of the present description, retrieving storage node-defined parameters for selection criteria includes at least one of periodically retrieving from each candidate storage node, storage node-defined parameters defined by an associated candidate storage node, and in response to an initiation of a backup operation, retrieving from each candidate storage node, storage node-defined parameters defined by the associated candidate storage node. In one embodiment of automated storage target selection in accordance with the present description, the user-defined parameters include at least one of a security level parameter, a retrieval speed parameter, a data durability parameter, a data usage pattern parameter, and a cost parameter.

In another aspect of the present description, automatic backup operations include storing in an entry of a catalog data structure, data identifying a backup data object transmitted to a selected storage node, and data identifying the selected storage node to which the backup data object of the entry was transmitted.

In yet another aspect of the present description, a determination is made as to whether a backup operation to be performed is related backup such as an incremental or differential backup operation which is related to an earlier backup operation already performed, and if so, retrieving from the catalog an identity of a selected node to which the backup data object of the earlier backup operation was transmitted. In one embodiment, the selecting a storage node of a plurality of storage nodes as a function of a plurality of selection criteria includes selecting for the backup operation, a retrieved identity of a selected node to which the backup data object of the earlier backup operation was transmitted.

In another aspect of the present description, a storage node may be provided by an online cloud storage service. Implementations of the described techniques may include hardware, a method or process, or computer software on a computer-accessible medium. Other features and aspects may be realized, depending upon the particular application.

BRIEF DESCRIPTION OF THE DRAWINGS

FIGS. 4a-4d illustrate examples of data structures configured for storing user-defined and storage node-defined selection parameters for automated storage target selection in accordance with one embodiment of the present description.

DETAILED DESCRIPTION

Figure 1:
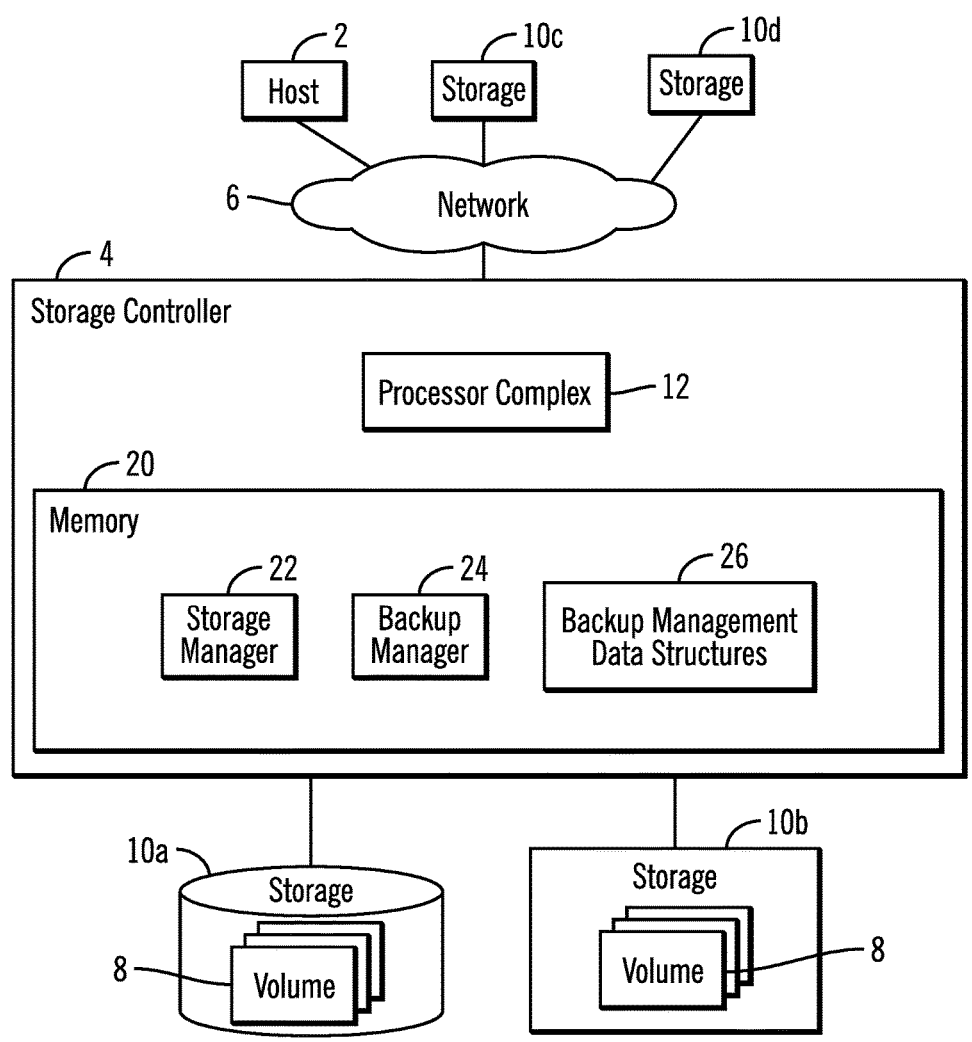
FIG. 1 illustrates an embodiment of a computing environment employing automated storage target selection in accordance with one aspect of the present description.

A system of one or more computers can be configured to perform automated storage target selection operations in accordance with one aspect of the present description, by virtue of having software, firmware, hardware, or a combination of them installed on the system that in operation causes or cause the system to perform automated storage target selection operations. For example, one or more computer programs can be configured to perform automated storage target selection operations by virtue of including instructions that, when executed by data processing apparatus, cause the apparatus to perform the actions.

Cloud storage is frequently used for long term data retention. There are many different providers to choose from, some with very different pricing models. Depending upon the type of workload being handled, it may make more economic sense to store the data in one cloud storage provider over another. The selection of a particular cloud storage provider is typically performed manually by a user.

It is recognized herein that the selection of a particular cloud storage provider for backup operations typically does not change until the user manually reselects another cloud storage provider. However, it is further recognized that the prices charged by cloud storage providers are frequently changing, both in transactional cost, that is the cost of a data write or read operation, and the cost of storage of the data between such operations. These price changes may go unnoticed by the user of the storage software until the bill is received from the cloud storage provider. At this point, a change in cloud provider can be made, but the higher cost has already been incurred.

One existing approach is to monitor changes in prices manually, and then update the cloud storage provider selection based on those findings. It is appreciated that such an approach may not only be very time consuming but also, depending upon the storage software, may be fairly difficult.

Another existing technique is to use a web-based application which assists in the selection of a cloud storage provider. In one such web-based application, the user inputs at a web site, various values for factors which typically affect the fees charged by the cloud storage providers. These factors may include the amount of storage needed, the amount of data to be transferred out, and the expected amounts of various data transfer methods, such as Get Requests and Put requests. Based on those inputs from the user, the web site may display a list of the least expensive cloud providers (as determined by the web site's cost computation algorithm) together with links to the websites for each of those providers.

It is appreciated herein that existing web-based applications are separate from the application which actually performs the process of backing up data. Accordingly, the user would typically open the web-based provider information application, enter values describing the storage needs of the user, filter through the results to pick the cheapest of the cloud storage providers, and then open the backup application and input the selected cloud storage provider.

Such a process can be both time consuming and difficult. In addition, unless the web-based application is frequently opened and used, recognition that a different, less expensive cloud storage provider should be selected due to changing conditions may be delayed, thereby increasing storage costs. Moreover, such web-based applications typically do not provide the ability for the user to select which cloud storage providers should be considered. As a result, the web-based application frequently shows results for all cloud storage providers for which it has data, whether or not a cloud storage provider is a suitable potential provider for a user.

One general aspect of automated storage target selection operations in accordance with the present description includes backup logic configured to perform automatic backup operations to backup data to a selected storage node as a backup data object. In one embodiment, the backup logic includes storage node selection logic configured to automatically select a storage node of a plurality of candidate storage nodes as a function of a plurality of selection criteria, to identify a selected storage node. The backup logic is further configured to transmit a backup data object to an automatically selected storage node. Other embodiments of this aspect include corresponding methods, computer systems, apparatus, and computer programs recorded on one or more computer storage devices, each configured to perform the actions described herein. As explained in greater detail below, such storage node selection logic can significantly reduce the burden of maintaining an up-to-date selection of a storage node for backup operations, as compared to existing manual operations.

In one embodiment, the backup logic further includes user-defined parameter retrieval logic configured to retrieve stored user-defined parameters for selection criteria for selecting a storage node, and storage node-defined parameter retrieval logic configured to retrieve storage node-defined parameters for selection criteria. For example, the user-defined and storage node-defined parameters may include at least one of a security parameter, a retrieval speed parameter, a data durability parameter, a data usage pattern parameter, and a cost parameter. The storage node selection logic is further configured to compare user-defined parameters and storage node-defined parameters, and select a storage node as a function of the comparison.

In another aspect of the present description, the storage node selection logic is further configured to broaden a first user-defined parameter to a second user-defined parameter broader than the first user-defined parameter if no candidate storage nodes have a storage node-defined parameter within the first user-defined parameter. Such an arrangement can facilitate an automatic storage node selection process should user-defined parameters be initially set at too narrow a value.

In one embodiment, the storage node-defined parameter retrieval logic is further configured to periodically retrieve from each candidate storage node, storage node-defined parameters defined by the particular candidate storage node. In another embodiment, storage node-defined parameters may be retrieved from each candidate storage node each time a backup operation is initiated. As a result, basing the automated storage node selection process on more current storage node-defined parameters is facilitated as well.

In another aspect of the present description, the backup logic may further include backup data object catalog logic maintaining a catalog data structure. The backup data object catalog logic is configured to store in an entry of the catalog data structure, data identifying a backup data object transmitted to a selected storage node, and data identifying the selected storage node to which the backup data object of the entry was transmitted. Thus, in one embodiment, backup logic is further configured to determine whether a backup operation to be performed is a related backup operation such as an incremental or differential backup operation related to an earlier backup operation already performed, and if so, retrieve from the catalog an identity of a selected node to which the backup data object of the earlier backup operation was transmitted. The storage node selection logic may be further configured to select for the incremental or differential backup operation, a retrieved identity of a selected node to which the backup data object of the earlier backup operation was transmitted. In one embodiment, one or more of the storage nodes may be provided by online cloud storage services.

Implementations of the described techniques may include hardware, a method or process, or computer software on a computer-accessible medium. FIG. 1 illustrates an embodiment of a computing environment employing automated storage target selection in accordance with the present description. On or more hosts 2 may submit Input/Output (I/O) requests to a storage controller or storage control unit 4 over a network 6 to access data at volumes 8 which may include Logical Unit Numbers, Logical Devices, Logical Subsystems, etc. in storage nodes 10a, 10b, each represented by a storage drive. Backup data may be stored in the storage nodes 10a, 10b and may also be stored over the network 6 to other storage nodes 10c, 10d represented by storage drives. Thus, a storage node 10a-10d as represented by a storage drive may be selected as a target storage drive utilizing automated target storage selection in accordance with the present description, as described in greater detail below.

One or more of the storage nodes represented by the storage drives 10a-10d may be operated by a third party which charges a fee for storing data. Thus, one or more of the storage nodes connected to the storage controller 4 over a network 6 may be provided by a third party cloud storage service in which a portion of the network 6 may include the internet.

In this embodiment, the storage controller 4 includes a processor complex 12, including one or more processors with single or multiple cores. The storage controller 4 further has a memory 20 that includes a storage manager 22 for managing the transfer of data between a host 2 and the storage nodes 10a, 10b. A backup manager 24 of the storage controller 4 manages backup operations which backup data from one storage node to another storage node 10a-10d. Data structures 26 store management data for managing backup operations. The storage manager 22 and backup manager 24 are shown in FIG. 1 as program code loaded into the memory 20 and executed by the processor complex 12. Alternatively, some or all of the logic functions may be implemented in hardware devices in the storage controller 4, such as in Application Specific Integrated Circuits (ASICs).

In one embodiment, the storage drives of the storage nodes 10a-10d may be comprised of one or more sequential access storage devices, such as hard disk drives and magnetic tape or may include non-sequential access storage devices such as solid state drives (SSD), for example. Each storage drive of the storage nodes 10a-10d may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, etc. Thus, in one example, the storage drives of the storage nodes 10a, 10c may include hard disk drives and the storage drives of the storage nodes 10b, 10d may include solid state drives, for example, having faster input/output characteristics than the storage drives of the storage nodes 10a, 10c. However, it is appreciated that the storage drives of the storage nodes may comprise other types of sequential or non-sequential access storage devices depending upon the particular application. Although depicted in FIG. 1 as four storage nodes 10a-10d, it is further appreciated that automated storage target selection in accordance with the present description may have a greater or fewer number of storage nodes, depending upon the particular application.

Figure 2:
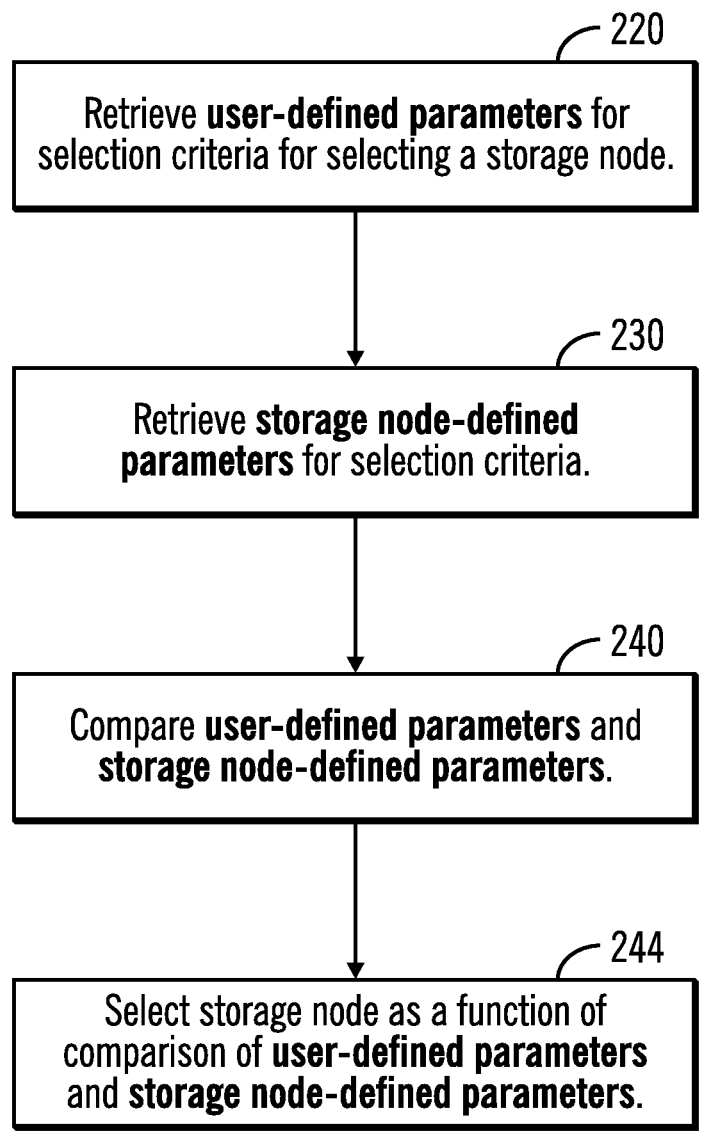
FIG. 2 illustrates an embodiment of operations for automated storage target selection in accordance with one aspect of the present description.

The network 6 may comprise a Storage Area Network (SAN), a Local Area Network (LAN), a Wide Area Network (WAN), the Internet, and Intranet, etc. FIG. 2 depicts one example of operations of automated target storage selection in accordance with the present description. In the example of FIG. 2, the operations depicted therein are performed by storage node selection logic 210 (FIG. 3) of the backup manager logic 24. Storage node selection logic 210 is configured to automatically select a storage node of a plurality of candidate storage nodes as a function of a various selection criteria, to identify a selected storage node. The selection criteria upon which the automated selection is made, may include characteristics of data storage such as levels of security provided by a storage node, speed at which data stored by a storage node may be retrieved from the storage node, the durability of data stored by the storage node, or the cost to store or retrieve data at a storage node if storage node is a third party storage node which charges a storage fee, etc.

In one aspect of the present description, operations depicted in FIG. 2 may be initiated in response to the initiation of a backup operation or may be initiated periodically such that after expiration of an interval of time, the operations of FIG. 2 are automatically repeated. In this manner, automated target storage selection in accordance with the present description may be based upon up-to-date parameters of the selection criterion upon which the automated selection is based.

As used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

In this example, the storage node selection logic 210 includes user-defined parameter retrieval logic 214 (FIG. 3) configured to retrieve (block 220, FIG. 2) stored user-defined parameters for selection criteria for selecting a storage node. Each selection criterion may be applied to the selection process using a parameter which quantifies or otherwise provides a measure of the associated selection criterion. For example, a security selection criterion may be quantified in various levels of security within a range of levels such as security-rating1 (SR1)-security-rating5 (SR5), for example, in which a level SR5 security rating provides the greatest degree of security and a level SR1 provides the lowest degree of security. Thus, a security rating of SR5 may correspond to a top secret government level, for example, and a security rating of SR4 may correspond to hospital Health Insurance Portability and Accountability Act (HIPPA) requirements, for example.

FIG. 4a illustrates an example of a data structure of the backup management data structures 26, which is maintained by the storage node selection logic 210 in the form of a table for storing and retrieving user-defined parameters for selection criteria. Accordingly, a user such as the user U1 (FIG. 4a) may input into the storage node selection logic 210 the required minimum level of security, such as level SR2, for example, to be provided by the storage node selected by the storage node selection logic 210. In a similar manner, the user may input into the storage node selection logic 210 additional user-defined parameters for selection criteria for selecting a storage node, such as a retrieval speed parameter indicating a preferred minimum speed at which data stored by a storage node may be retrieved from the storage node, a data durability parameter indicating the preferred durability of data stored by the storage node, a data usage parameter indicating the anticipated pattern of data usage, etc.

In the example of FIG. 4a, an input retrieval speed may be quantified as a minimum expected retrieval speed as represented by a retrieval speed value such as Fast, Moderate, Slow, etc. In the example of FIG. 4a, data durability may be quantified as a function of the number of backups and geographical separation of the backups, for example. Thus, data durability may be quantified as a percentage reliability such 99% reliable, 99.5% reliable, 99.98% reliable etc., which in turn may be represented by a durability level value such as High, Medium, Low, etc.

The storage node selection logic 210 stores the user-defined parameters defined by a user such as the user U1 and then retrieves (block 220, FIG. 2) at the appropriate time, the stored user-defined parameters associated with the selection criteria for selecting a storage node for the backup operation of the user U1. In one embodiment, the user-defined parameters may be retrieved (block 220) each time a backup operation is initiated to ensure that the latest values of the user-defined parameters are utilized for the automated target storage selection in accordance with the present description. In another embodiment, the user-defined parameters may be retrieved (block 220) periodically upon expiration of an interval of time which may be user programmable, for example.

User-defined parameters may be input and stored for use in automated target storage selection in accordance with the present description, on a global basis such that a single set of user-defined parameters may be utilized for all backup operations performed by the backup manager logic 24. In another embodiment, it is appreciated that different sets of user-defined parameters may be input and stored for use in connection with different sets of data being backed up. For example, a particular set of user-defined parameters may be input and stored for use with the backup of a defined set of data D1, D2, (FIG. 4a) such as data stored by a particular user such as the user U1 in a particular storage drive, or in a particular volume, or in a particular file, or in a particular track, etc. Thus, when a backup operation is initiated for a defined set of data D1, the associated set of user-defined parameters for that set of data D1 is retrieved (block 220) for the user U1. Similarly, another set of user-defined parameters may be input and stored for use with the backup of a defined set of data D3, D4 such as data stored by another user such as the user U2 in a particular storage drive, or in a particular data object, or in a particular volume, or in a particular file, or in a particular track, etc. Thus, when a backup operation is initiated for the defined set of data D3 of the user U2, the associated set of user-defined parameters for that set of data D3 is retrieved (block 220) for the user U2. Accordingly, user-defined parameters may be separately stored and retrieved for particular users, storage locations, or data units.

In one embodiment, the user is afforded an opportunity to select a pool of candidate storage nodes from which a storage node for a backup operation may be automatically selected. In the example of FIG. 4a, the table of FIG. 4a includes a field "Candidate Pool" in which the user may identify each member of a pool of candidate storage nodes for a backup operation for a particular data set. In this example, the users have selected the candidate pool of storage node providers identified as P1, P2, P3, P4, P5 . . . Pn. Although the same pool has been selected for each data set D1-D4 in this example, a user may select different pools for different data sets, depending upon which storage pool providers may be suitable candidates for each data set.

In one embodiment, a user may establish an account in advance for each member of the candidate pool of storage node providers, prior to selection of a storage node provider for a particular backup operation. Thus, suitable credentials would be obtained for each member of the candidate pool to permit data to be stored at a storage node of the pool of storage nodes in the event that node was selected. In another embodiment, a user may be prompted to establish an account should a storage node selected for a backup operation not have a preexisting account.

Once the user or users have input suitable user-defined parameters as indicated in FIG. 4a, for example, the storage node selection process may proceed automatically without further user involvement in many circumstances. FIG. 4b illustrates an example of a data structure of the backup management data structures 26, which is maintained by the storage node selection logic 210 in the form of a table for storing and retrieving storage node-defined parameters for selection criteria for the storage nodes of the candidate pool as defined by the user or users. Accordingly, the storage node selection logic 210 further includes storage node-defined parameter retrieval logic 224 (FIG. 3) configured to retrieve (block 230, FIG. 2) storage node-defined parameters for selection criteria for selecting a storage node.

A storage node-defined parameter, like a user-defined parameter, quantifies or otherwise provides a measure of the associated selection criterion. In manner similar to that described above in connection with a security level provided by each candidate storage node, each candidate storage node may define additional storage node-defined parameters for selection criteria for selecting a storage node, such as a retrieval speed parameter, e.g. Slow, Moderate . . . Fast, indicating the minimum speed or maximum retrieval time at which data stored by a candidate storage node may be retrieved from that candidate storage node, a data durability parameter DL1, DL2 . . . indicating the minimum durability of data stored by the candidate storage node, one or more cost parameters indicating the costs of storage having a particular pattern of data usage, etc.

Accordingly, storage node-defined parameters may be retrieved (block 230, FIG. 2) by the storage node-defined parameter retrieval logic 224 for each candidate storage node of the user-defined pool at an appropriate time. As described above, in one embodiment, the storage node-defined parameters may be retrieved (block 230) each time a backup operation is initiated to ensure that the latest values of the storage-node-defined parameters are utilized for the automated target storage selection in accordance with the present description. In another embodiment, the storage node-defined parameters may be retrieved (block 230) periodically and stored for subsequent use as backup operations are initiated.

The storage node-defined parameters may be retrieved (block 230) using any suitable retrieval technique. For example, the storage node-defined parameter retrieval logic 224 (FIG. 3) may be configured to retrieve (block 230, FIG.

2) storage node-defined parameters using an Application Program Interface (API). Other techniques may be used, depending upon the particular application.

In the example of FIG. 2, the storage node selection logic 210 further includes storage selection parameter comparator logic 234 (FIG. 3) configured to compare (block 240, FIG. 2) user-defined parameters and storage node-defined parameters, and select (block 244, FIG. 2) a storage node as a function of the comparison of the user-defined parameters and storage node-defined parameters. In one embodiment, the retrieval of storage node-selected parameters and the selection of a storage node as a function of user-defined and storage node-defined parameters may be performed each time a backup operation is initiated to ensure that the latest values of the storage node-defined parameters are utilized for the automated target storage selection in accordance with the present description. In another embodiment, the storage node-defined parameters may be retrieved and the selection of a storage node as a function of user-defined and storage node-defined parameters may be performed periodically upon expiration of an interval of time which may be user programmable, for example.

Figure 3:
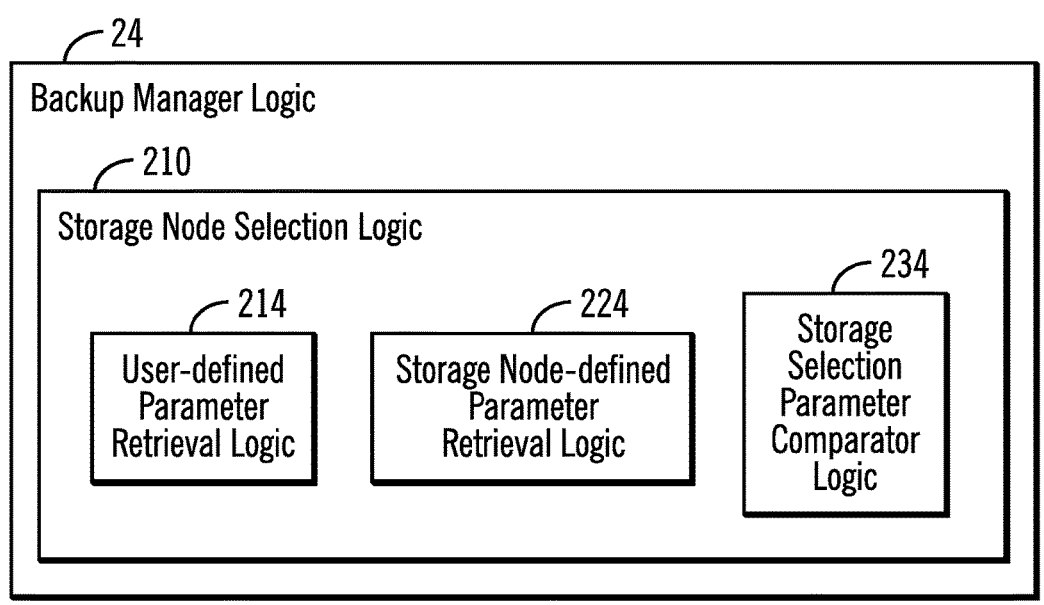
FIG. 3 illustrates an embodiment of automated storage target selection logic of a backup manager in accordance with one aspect of the present description.
Figure 5A:
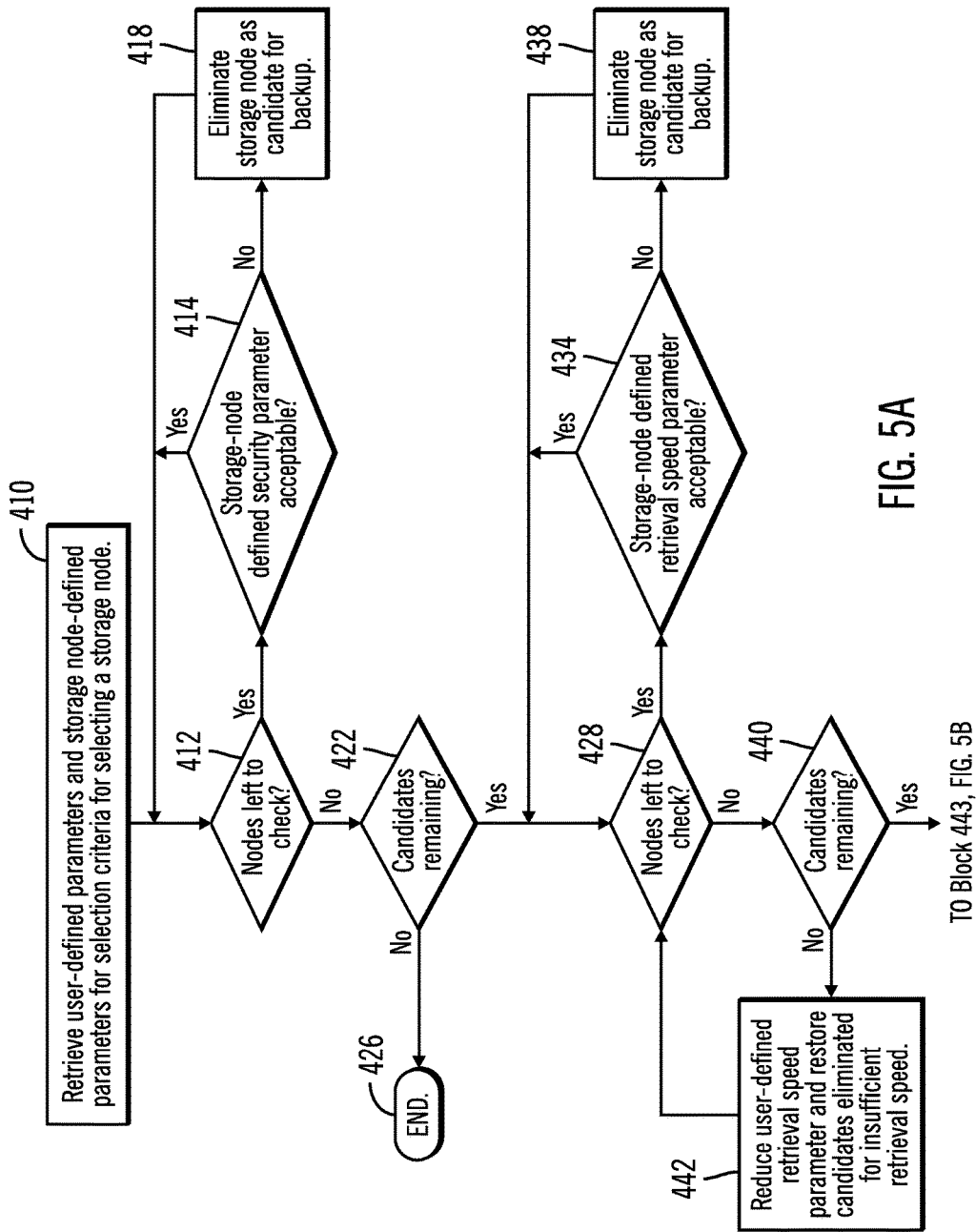
FIGS. 5a, 5b illustrate another embodiment of operations for automated storage target selection in accordance with one aspect of the present description.
Figure 5B:
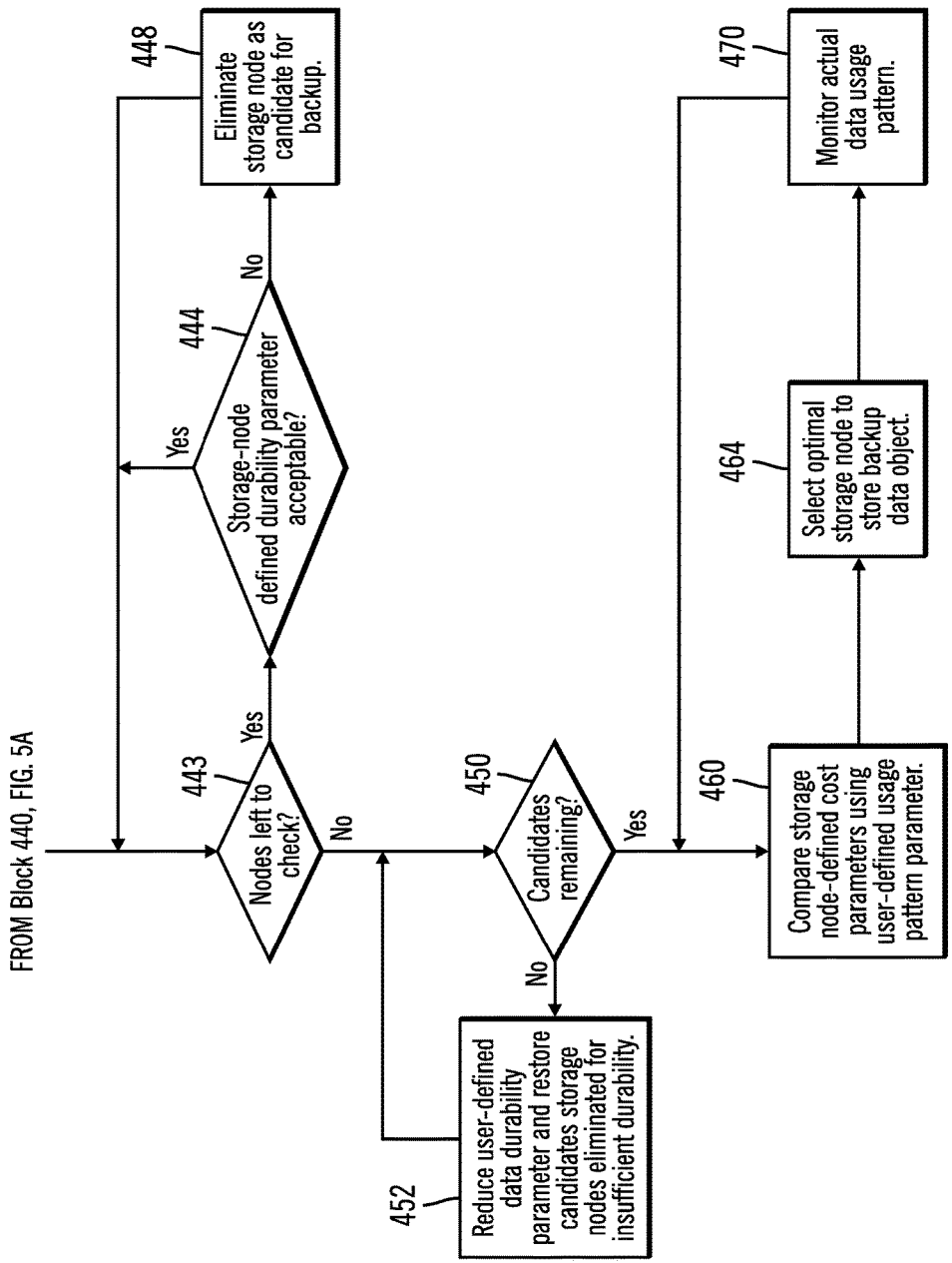

FIGS. 5a, 5b depict a more detailed example of the operations of the storage selection parameter comparator logic 234 (FIG. 3). In this example, user-defined parameter retrieval logic 214 (FIG. 3) retrieves (block 410, FIG. 5a) user-defined parameters for the data to be backed up, and storage node-defined parameter retrieval logic 224 retrieves (block 410, FIG. 5a) for each candidate storage node of the user-defined pool, storage node-defined parameters of selection criteria for selecting a storage node as described above in connection with FIG. 2.

Using retrieved security parameters, a determination (block 412, FIG. 5a) is made by storage selection parameter comparator logic 234 (FIG. 3), as to whether there are additional storage nodes to check for acceptability, and if so, a determination (block 414, FIG. 5a) is made by storage selection parameter comparator logic 234 (FIG. 3), as to whether a storage-node defined security parameter for a candidate storage node is acceptable, that is, whether or not the storage-node defined security parameter is less than the corresponding user-defined security parameter. If the storage node is not acceptable, that storage node is eliminated (block 418, FIG. 5a) as a candidate for selection as the target storage node of the backup operation. For example, for a backup operation for the data set D1 (FIG. 4a) of the user U1, the retrieved storage-node defined security parameter for a candidate storage node P2 (FIG. 4b) indicates that the candidate storage node provides a level of security of SR1, for example, and the user-defined security parameter for data set D1 (FIG. 4a) of user U1 requires security to be provided at a level of at least SR2, for example. Accordingly, for the storage node P2 which provides security at a level of SR1, it would be determined (block 414, FIG. 5a) that the storage-node defined security parameter (equal to SR1) for the candidate storage node P2 is not acceptable, that is, it is less than the corresponding user-defined security parameter (equal to SR2) and the storage node P2 would be eliminated (block 418, FIG. 5a) as a candidate for selection as the target storage node of the backup operation for the data set D1 of the user U1.

The comparison (block 414, FIG. 5a) of the storage-node defined security parameter for a candidate storage node, to the corresponding user-defined security parameter continues until all unacceptable storage nodes, that is, storage nodes having a storage-node defined security parameter less than the corresponding user-defined security parameter have been eliminated (block 418, FIG. 5a) as a candidate for selection as the target storage node of the backup operation. Since all the candidate storage nodes provide a level of security of at least SR3 in the example of FIG. 4b with the exception of the storage node P2, the remaining pool of candidates storage nodes would include all the storage nodes P1, P3, P4, P5 except storage node P2. In this manner, the pool of candidate storage nodes is narrowed.

If it is determined that (block 422, FIG. 5a) that no candidates remain, that is, all storage nodes have been eliminated as candidates for the backup operation because the level of security provided by the storage nodes is less than that required as indicated by the user-defined security parameter, the backup operation ends (block 426) in this embodiment. Thus, for a backup operation for the data set D2 of the user U1, the user-defined security parameter indicates a required security level of at least SR5. Since none of the candidate storage nodes of FIG. 4b provide a security level of at least SR5 in that example, all candidates storage nodes would eliminated as unacceptable in that example, and the backup operation would be terminated.

Conversely, if at least some candidate storage nodes remain in the narrowed pool once all candidate storage nodes have been screened (block 414) to eliminate those storage nodes which provide an insufficient level of security, the selection process continues with the pool of candidate storage nodes reduced or narrowed to those storage nodes which provide a level of security at or higher than that required as indicated by the user-defined security parameter.

Using retrieved retrieval speed parameters, a determination (block 428, FIG. 5a) is made by storage selection parameter comparator logic 234 (FIG. 3), as to whether there are additional storage nodes to check for acceptability, and if so, a determination (block 434, FIG. 5a) is made by storage selection parameter comparator logic 234 (FIG. 3), as to whether the storage-node defined retrieval speed parameter for a remaining candidate storage node is acceptable. In one embodiment, a storage node is determined to be unacceptable if it is determined that the storage node-defined retrieval speed parameter is less than (that is, slower than) the corresponding user-defined retrieval speed parameter. If so, that storage node is determined to be unacceptable and is eliminated (block 438, FIG. 5a) as a candidate for selection as the target storage node of the backup operation.

For example, for a backup operation for the data set D1 (FIG. 4a) of the user U1, the retrieved storage-node defined retrieval speed for a candidate storage node P3 (FIG. 4b) indicates that the candidate storage node P3 provides a retrieval speed of "Slow" whereas the user-defined retrieval speed parameter for data set D1 (FIG. 4a) of user U1 specifies retrieval to be provided at a speed of at least Moderate, for example. Accordingly, for the storage node P3 which provides a retrieval speed of "Slow", it would be determined (block 434, FIG. 5a) that the storage-node defined retrieval speed parameter (equal to Slow) for the candidate storage node P3 is unacceptable, that is, less than the corresponding user-defined retrieval speed parameter (equal to Moderate) and the storage node P3 would be eliminated (block 438, FIG. 5a) as a candidate for selection as the target storage node of the backup operation for the data set D1 of the user U1.

The comparison (block 434, FIG. 5a) of the storage-node defined retrieval speed parameter for a candidate storage node, to the corresponding user-defined retrieval speed parameter continues until all storage nodes having a storage-node defined retrieval speed parameter less than the corresponding user-defined retrieval speed parameter have been eliminated (block 438, FIG. 5*a*) as a candidate for selection as the target storage node of the backup operation. Accordingly, for a backup operation for the data set D1 (FIG. 4*a*) of the user U1, the remaining candidate storage nodes are the storage nodes P1, P4, P5, Pn following the elimination (block 418, FIG. 5*a*) of the storage node P2 for insufficient security level, and the elimination (block 438, FIG. 5*a*) of the storage node P3 for insufficient retrieval speed. In this manner, the pool of candidate storage nodes continues to narrow.

If it is determined that (block 440, FIG. 5*a*) that no candidates remain, that is, all storage nodes have been eliminated as candidates for the backup operation because the level of retrieval speed provided by the storage nodes is less than that specified as indicated by the user-defined retrieval speed parameter, the user-defined retrieval speed parameter is reduced (block 442, FIG. 5*a*) to be satisfied by additional, slower retrieval speeds. Accordingly, the candidates previously eliminated due to an excessively restrictive user-defined retrieval speed parameter are restored and the candidates are screened (block 434) again.

For example, for a backup operation for the data set D3 (FIG. 4*a*) of the user U2, all candidate storage nodes would be initially eliminated (block 438, FIG. 5*a*) because the storage node-defined retrieval speed for all storage nodes is initially slower than that of the user-defined retrieval speed specified as "Fast". Accordingly, the user-defined retrieval speed parameter is reduced (block 442, FIG. 5*a*) from Fast for the data set D3 (FIG. 4*a*) of the user U2, to the slower retrieval speed "Moderate."

The candidates previously eliminated due to the excessively restrictive user-defined retrieval speed parameter "Fast" are restored and the candidates are screened (block 434) again and the comparison of the storage-node defined retrieval speed parameter for a candidate storage node, to the reduced corresponding user-defined retrieval speed parameter continues until all storage nodes having a storage-node defined retrieval speed parameter equal to or less than the reduced corresponding user-defined retrieval speed parameter have been eliminated (block 438, FIG. 5*a*) as a candidate for selection as the target storage node of the backup operation.

Accordingly, for the backup operation for the data set D3 (FIG. 4*a*) of the user U2, the remaining candidate storage nodes are the storage nodes P1, P4, P5, Pn following the elimination (block 418, FIG. 5*a*) of the storage node P2 for insufficient security level, and the elimination (block 438, FIG. 5*a*) of the storage node P3 for insufficient retrieval speed as compared to the reduced (block 442, FIG. 5*a*) user-defined retrieval speed of Moderate. In this manner, the selection process continues, reducing the user-defined retrieval speed parameter as needed until at least some candidate storage nodes remain with the pool of candidate storage nodes narrowed to those storage nodes which provide a level of retrieval speed at or greater than that specified as indicated by the original or a reduced user-defined retrieval speed parameter.

Using retrieved data durability parameters, a determination (block 443, FIG. 5*b*) is made by storage selection parameter comparator logic 234 (FIG. 3), as to whether there are additional storage nodes to check for acceptability, and if so, a determination (block 444, FIG. 5*b*) is made by storage selection parameter comparator logic 234 (FIG. 3), as to whether a storage-node defined data durability parameter for a remaining candidate storage node is acceptable. In one embodiment, the storage node-defined data durability parameter is unacceptable if it is less than the corresponding user-defined data durability parameter. If so, that storage node is eliminated (block 448, FIG. 5*b*) as a candidate for selection as the target storage node of the backup operation.

For example, for a backup operation for the data set D1 (FIG. 4*a*) of the user U1, the retrieved storage-node defined retrieval speed for a candidate storage node P5 (FIG. 4*b*) indicates that the candidate storage node P5 provides a durability of "Low" whereas the user-defined data durability parameter for data set D1 (FIG. 4*a*) of user U1 specifies a data durability level to be provided at at least Medium, for example. Accordingly, for the storage node P5 which provides a durability of "Low", it would be determined (block 444, FIG. 5*b*) that the storage-node defined durability parameter (equal to Low) for the candidate storage node P5 is unacceptable, that is, less than the corresponding user-defined data durability parameter (equal to Medium) and the storage node P5 would be eliminated (block 448, FIG. 5*b*) as a candidate for selection as the target storage node of the backup operation for the data set D1 of the user U1.

The comparison (block 444, FIG. 5*b*) of the storage-node defined data durability parameter for a remaining candidate storage node, to the corresponding user-defined data durability parameter continues until all storage nodes having a storage-node defined data durability parameter less than the corresponding user-defined data durability parameter have been eliminated (block 448, FIG. 5*b*) as a candidate for selection as the target storage node of the backup operation. Accordingly, for a backup operation for the data set D1 (FIG. 4*a*) of the user U1, the remaining candidate storage nodes have been narrowed to the storage nodes P1, P4, Pn following the elimination (block 418, FIG. 5*a*) of the storage node P2 for insufficient security level, the elimination (block 438, FIG. 5*a*) of the storage node P3 for insufficient retrieval speed, and the elimination (block 448, FIG. 5*b*) of the storage node P5 for insufficient data durability.

If it is determined that (block 450, FIG. 5*b*) that no candidates remain, that is, all storage nodes have been eliminated as candidates for the backup operation because the level of data durability provided by the storage nodes is less than that initially specified as indicated by the user-defined data durability parameter, the user-defined data durability parameter is reduced (block 452, FIG. 5*b*) to be satisfied by additional, lower levels of durability. Accordingly, the candidates previously eliminated due to an excessively restrictive user-defined data durability parameter are restored and the candidates are screened (block 444) again.

For example, for a backup operation for the data set D4 (FIG. 4*a*) of the user U2, all candidate storage nodes would be initially eliminated (block 448, FIG. 5*b*) because the storage node-defined durability for all previously remaining candidate storage nodes is initially lower (i.e. Medium) than that of the user-defined durability parameter specified as "High". Accordingly, the user-defined durability parameter is reduced (block 452, FIG. 5*b*) from High for the data set D4 (FIG. 4*a*) of the user U2, to the lower data durability level "Medium."

The candidates previously eliminated due to an excessively restrictive user-defined data durability parameter "High" are restored and the candidates are screened (block 444) again. Accordingly, a comparison of the storage-node defined data durability parameter for a candidate storage node, to the lowered corresponding user-defined data durability parameter continues (block 444) until all unacceptable storage nodes, that is, storage nodes having a storage-node defined data durability parameter less than the lowered corresponding user-defined data durability parameter have been eliminated (block 448, FIG. 5*b*) as a candidate for selection as the target storage node of the backup operation. Accordingly, for the backup operation for the data set D4 (FIG. 4a) of the user U2, the remaining candidate storage nodes have been narrowed to the storage nodes P1, P4, Pn following the elimination (block 418, FIG. 5a) of the storage node P2 for insufficient security level, the elimination (block 438, FIG. 5a) of the storage node P3 for insufficient retrieval speed, and the elimination (block 448, FIG. 5b) of the storage node P5 for insufficient durability as compared to the reduced (block 452, FIG. 5b) user-defined durability of Medium.

The selection process continues, lowering the user-defined data durability parameter as needed until at least some candidate storage nodes remain so that the pool of candidate storage nodes is narrowed to those storage nodes which provide a level of data durability at or higher than that specified as indicated by the original or a lowered user-defined data durability parameter.

In one embodiment of automated storage target selection for data backup in accordance with the present description, storage or data transmission costs may not be a factor in such automated section. For example, if the remaining members of the narrowed pool of candidate storage nodes are owned by the user, an optimum target storage node may be selected having the best storage node-defined parameters for the selection criteria without regard to a cost parameter in some embodiments. Thus, a storage node of the filtered pool of candidate storage nodes which has been narrowed as described in connection with FIGS. 5a, 5b, providing the best combination of, for example, security, retrieval speed and data durability, ranked in that order, may be automatically selected in automated storage target selection for data backup in accordance with the present description. It is appreciated that selection criteria may be ranked in other orders, depending upon the particular application.

In another embodiment of automated storage target selection for data backup in accordance with the present description, storage or data transmission costs may be a substantial factor in such automated selection. For example, if one or more members of the remaining, narrowed pool of candidate storage nodes are owned by a third party, the storage-node defined parameters may include the costs of storage or transmission to or from the third party candidate storage node. Frequently, the costs associated with such data transmission or storage are a function of the manner in which the data stored at the third party candidate storage node, is accessed. The anticipated pattern of data usage for a set of data stored at a third party candidates storage node, may be defined in the form of a user-defined data usage pattern for each data set as indicated in FIG. 4a. For example, in one pattern of data usage, it is anticipated that read operations will predominate as represented in FIG. 4a by the user-defined data usage pattern parameter value "Read" for the data set D1 of the user U1. Conversely, in another pattern of data usage, it is anticipated that write operations will predominate as represented in FIG. 4a by the user-defined data usage pattern parameter value "Write" for the data set D2 of the user U1. In yet another pattern of data usage, it is anticipated that read and write operations will be substantially evenly balanced as represented in FIG. 4a by the user-defined data usage pattern parameter value "Even" for the data set D3, D4 of the user U2.

Data may be transferred to or from a storage node using a variety of transfer protocols. One frequently used protocol is the Hypertext Transfer Protocol (HTTP) in which data is transferred in a "session" which includes a sequence of network requests and responses between an HTTP client and an HTTP server. An HTTP client which may be the user's backup application for example, initiates a request by establishing a Transmission Control Protocol (TCP) connection to a particular port on a server of the storage node. An HTTP server of the storage node listening on that port waits for a request message from an HTTP client. Upon receiving the request, the server sends back a response which may include a requested resource such as data previously stored on the storage node by the HTTP client.

The HTTP protocol provides various authentication schemes such as Basic access authentication and Digest access authentication which operate via a challenge/response mechanism whereby the server identifies and issues a challenge before serving the requested content. A user or HTTP client frequently establishes an account associated with one or more storage nodes to receive suitable authentication credentials to pass the challenge/response mechanism. In one embodiment, an HTTP client may be assigned a unique user name and password as authentication credentials to pass the challenge/response mechanism.

The HTTP protocol defines methods (often referred to as verbs) to indicate a desired action to be taken with respect to a resource which may be identified and located on a network by uniform resource locators (URLs), using uniform resource identifier (URI) schemes http and https. A third party storage node frequently charges different fees for different HTTP methods. For example, FIG. 4c illustrates an example of a data structure of the backup management data structures 26, which is maintained by the storage node selection logic 210 in the form of a table for storing and retrieving storage node-defined cost parameters for selection criteria associated with various HTTP methods. One such HTTP method is a Put Request which requests that an enclosed entity such as data objects created in a backup of a data set D1, D2, D3 . . . , for example, be stored at a URI as identified by the Put Request. If the URI identifies a location of a preexisting resource, that resource is modified using the enclosed entity. Conversely, if the URI does not identify a location of a preexisting resource, the HTTP server can create the resource at the location identified by the supplied URI.

Fees charged by a third party storage node may vary from storage node to storage node, and from HTTP method to HTTP method. Thus, as shown in FIG. 4c, each candidate storage node or storage node provider1 (P1), provider2 (P2), provider3 (P3), provider4 (P4), provider5 (P5) providerN (Pn) (FIG. 4c) may define its own associated Put Request cost (or fee charge) as represented by the Put Request costs $PutReq1, $PutReq2, $PutReq3, $PutReq1, $PutReq4, $PutReq5, $PutReqN, respectively.

Another HTTP method is a Post Request which requests that the HTTP server accept the entity enclosed in the request as a new subordinate of the resource identified by the URI. Such a subordinate may be, for example, an annotation of an existing resource or a data object to be added to a database, for example. Here too, each candidate storage node or storage node provider1 (P1), provider2 (P2), provider3 (P3), provider4 (P4), provider5 (P5) providerN (Pn) (FIG. 4c) may define its own associated Post Request cost (or fee charge) as represented by the Post Request costs $PostReq1, $osutReq2, $PostReq3, $PostReq1, $PostReq4, $PostReq5, $PostReqN, respectively.

Still another HTTP method is a Get Request which requests that the HTTP server provide a representation of the specified resource. Requests using a GET Request method typically only retrieve data and have no other effect. Here too, each candidate storage node or storage node provider1

(P1), provider2 (P2), provider3 (P3), provider4 (P4), provider5 (P5) providerN (Pn) (FIG. 4c) may define its own associated Get Request cost (or fee charge) as represented by the Get Request costs $GetReq1, $GetReq2, $GetReq3, $GetReq1, $GetReq4, $GetReq5, $GetReqN, respectively.

Another HTTP method is a Delete Request which requests that the HTTP server delete the specified resource. Again, each candidate storage node or storage node provider1 (P1), provider2 (P2), provider3 (P3), provider4 (P4), provider5 (P5) . . . providerN (Pn) (FIG. 4c) may define its own associated Delete Request cost (or fee charge) as represented by the Delete Request costs $DetReq1, $DelReq2, $DelReq3, $DelReq1, $DelReq4, $DelReq5, $DelReqN, respectively.

Still another HTTP method is a Head Request which requests that the HTTP server method provide a response similar to that described above in connection with a GET request, but limited to the header of the response and thus without the body of the response which would have been provided in response to a Get Request. A Head request is often utilized to obtain metadata written in response headers, without requiring a transferal of the entire content of a response to a Get Request. Again, each candidate storage node or storage node provider1 (P1), provider2 (P2), provider3 (P3), provider4 (P4), provider5 (P5) providerN (Pn) (FIG. 4c) may define its own associated Head Request cost (or fee charge) as represented by the Head Request costs $HeadReq1, $HeadReq2, $HeadReq3, $HeadReq1, $HeadReq4, $HeadReq5, $HeadReqN, respectively.

Using retrieved storage node-defined cost parameters, the storage selection parameter comparator logic 234 (FIG. 3), compares (block 460, FIG. 5b) the appropriate costs of the remaining candidate storage node pool members as a function of the relevant data usage pattern, and the storage node selection logic 210 (FIG. 3) selects (block 464, FIG. 5b) the optimal storage node of the remaining candidate storage node pool members for the backup operation. For example, for a backup operation for the data set D1 (FIG. 4a) of the user U1, the remaining candidate storage nodes are the storage nodes P1, P4, Pn following the elimination (block 418, FIG. 5a) of the storage node P2 for insufficient security level, the elimination (block 438, FIG. 5a) of the storage node P3 for insufficient retrieval speed, and the elimination (block 448, FIG. 5b) of the storage node P5 for insufficient data durability as described above. Moreover, the data usage pattern for the data set D1 (FIG. 4a) of the user U1 has been defined as the "Read" pattern in which read operations predominate. Accordingly, for a Read data usage pattern, the Get Request and Head Request cost information for the storage nodes P1, P4, Pn may be selected as the more relevant cost parameters in one embodiment and compared (block 460, FIG. 5b) by the storage selection parameter comparator logic 234 (FIG. 3). The storage node selection logic 210 (FIG. 3) then selects (block 464, FIG. 5b) as a function of the comparison, the optimal storage node of the remaining candidate storage node pool members P1, P4, Pn for the backup operation directed to the data set D1 (FIG. 4a) of the user U1. In one embodiment, the optimal storage node of the remaining candidate storage node pool members P1, P4, Pn for the backup operation directed to the data set D1 (FIG. 4a) of the user U1, may be the storage node having the lowest fees for one or both of the Get Request and Head Request, such as an average of the fees for each Get Request and Head Request method, for example. It is appreciated that other storage node-defined cost parameters may be selected for a read data usage pattern, depending upon the particular application.

In another example, for a backup operation for the data set D2 (FIG. 4a) of the user U1, the remaining candidate storage nodes are again, the storage nodes P1, P4, Pn. However, the data usage pattern for the data set D2 (FIG. 4a) of the user U1 has been defined the "Write" pattern in which write operations predominate. Accordingly, for a Write data usage pattern, the Put Request and Post Request cost information for the storage nodes P1, P4, Pn may be selected as the more relevant cost parameters in one embodiment and compared (block 460, FIG. 5b) by the storage selection parameter comparator logic 234 (FIG. 3). The storage node selection logic 210 (FIG. 3) then selects (block 464, FIG. 5b) as a function of the comparison, the optimal storage node of the remaining candidate storage node pool members P1, P4, Pn for the backup operation directed to the data set D2 (FIG. 4a) of the user U1. In one embodiment, the optimal storage node of the remaining candidate storage node pool members P1, P4, Pn for the backup operation directed to the data set D2 (FIG. 4a) of the user U1, may be the storage node having the lowest fees for one or both of the Put Request and Post Request methods, such as an average of the fees for each Put Request and Post Request method, for example. It is appreciated that other storage node-defined cost parameters may be selected for a Write data usage pattern, depending upon the particular application.

In still another example, for a backup operation for the data set D3 (FIG. 4a) of the user U2, the remaining candidate storage nodes are again, the storage nodes P1, P4, Pn. However, the data usage pattern for the data set D3 (FIG. 4a) of the user U2 has been defined the "Even" pattern in which read and write operations are evenly balanced. Accordingly, for an Even data usage pattern, the Get Request, Head Request, Put Request and Post Request cost information for the storage nodes P1, P4, Pn may be selected as the more relevant cost parameters in one embodiment and compared (block 460, FIG. 5b) by the storage selection parameter comparator logic 234 (FIG. 3). The storage node selection logic 210 (FIG. 3) then selects (block 464, FIG. 5b) as a function of the comparison, the optimal storage node of the remaining candidate storage node pool members P1, P4, Pn for the backup operation directed to the data set D3 (FIG. 4a) of the user U2. In one embodiment, the optimal storage node of the remaining candidate storage node pool members P1, P4, Pn for the backup operation directed to the data set D2 (FIG. 4a) of the user U1, may be the storage node having the lowest fees for an average of the Get Request, Head Request, Put Request and Post Request methods. It is appreciated that other storage node-defined cost parameters may be selected for an Even data usage pattern, depending upon the particular application.

In one embodiment, the storage node selection logic 210 (FIG. 3) may monitor (block 470, FIG. 5b) various parameters such as the actual data usage pattern or prices being charged by the candidate storage nodes. If a parameter such as the actual data usage pattern differs substantially from the anticipated data usage pattern as defined in the Usage field of the user-defined parameter table of FIG. 4a, the data usage parameter value may be updated to more closely conform to the actual data usage pattern experienced. Similarly, if a parameter such as costs changes from the values of the storage node-defined parameters of FIGS. 4c, 4d, the cost parameters may be updated to more closely conform to the actual cost parameters.

In some embodiments, as a result of changes in parameters, the storage selection parameter comparator logic 234 (FIG. 3), can recompare (block 460, FIG. 5b) revised costs, if any, of the remaining candidate storage node pool members as a function of a revised data usage pattern, if any, and the storage node selection logic 210 (FIG. 3) can reselect (block 464, FIG. 5*b*) the optimal storage node of the remaining candidate storage node pool members for the backup operation, as a function of any revised comparison. In this manner, the storage selection parameter comparator logic 234 (FIG. 3) can continuously assess and reassess the cost effectiveness of the selected cloud storage provider, and change the selected storage node as appropriate due to changed conditions. The period for reassement may be monthly, daily, hourly, or transactionally such as each new read or write operation to the selected storage node. Various historical data may be tracked and stored such as data indicating how much data has been successfully stored in each storage node, HTTP request history and bandwidth usage.

It is appreciated that fees charged by a third party storage node may be represented by other storage node-defined parameters. FIG. 4*d* illustrates an example of a data structure of the backup management data structures 26, which is maintained by the storage node selection logic 210 in the form of a table for storing and retrieving storage node-defined cost parameters for selection criteria associated with other data transfer characteristics. One such data transfer characteristic is an upload bandwidth cost for fees associated with bandwidth provided by the third party storage node for data transfers to the storage node. Thus, each candidate storage node or storage node provider1 (P1), provider2 (P2), provider3 (P3), provider4 (P4), provider5 (P5) providerN (Pn) (FIG. 4*c*) may define its own associated upload bandwidth cost as represented by the Upload Bandwidth costs $UpBand1, $UpBand2, $UpBand3, $UpBand4, $UpBand5, $UpBandN, respectively.

Another data transfer characteristic is a download bandwidth cost for fees associated with bandwidth provided by the third party storage node for data transfers from the storage node. Thus, each candidate storage node or storage node provider1 (P1), provider2 (P2), provider3 (P3), provider4 (P4), provider5 (P5) providerN (Pn) (FIG. 4*c*) may define its own associated download bandwidth cost as represented by the Download Bandwidth costs $DownBand1, $DownBand2, $DownBand3, $DownBand4, $DownBand5, $DownBandN, respectively.

Yet another data storage characteristic is a data storage charge for storing data in the storage node. Thus, each candidate storage node or storage node provider1 (P1), provider2 (P2), provider3 (P3), provider4 (P4), provider5 (P5) providerN (Pn) (FIG. 4*c*) may define its own associated data storage cost as represented by the Storage costs $Storage1, $Storage2, $Storage3, $Storage4, $Storage5, $StorageN, respectively.

Another data transfer characteristic is a charge by the third party storage node for data transfers to the storage node, referred to as "Data In" in the table of FIG. 4*d*. Thus, each candidate storage node or storage node provider1 (P1), provider2 (P2), provider3 (P3), provider4 (P4), provider5 (P5) providerN (Pn) (FIG. 4*c*) may define its own associated Data In cost as represented by the Data In costs $DataIn1, $DataIn2, $DataIn3, $DataIn4, $DataIn5, $DataInN, respectively.

Still another data transfer characteristic is a charge by the third party storage node for data transfers from the storage node, referred to as "Data Out" in the table of FIG. 4*d*. Thus, each candidate storage node or storage node provider1 (P1), provider2 (P2), provider3 (P3), provider4 (P4), provider5 (P5) providerN (Pn) (FIG. 4*c*) may define its own associated Data Out cost as represented by the Data Out costs $DataOut1, $DataOut2, $DataOut3, $DataOut4, $DataOut5, $DataOutN, respectively.

The storage node-defined cost parameters of the table of FIG. 4*d* may be retrieved (block 410, FIG. 5*a*) and used alone or in combination with other storage node-defined cost parameters such as those of the table of FIG. 4*c* discussed above, to select the optimal storage node for the backup operation in a manner similar to that described above in connection with the table of FIG. 4*c*. Thus, the storage selection parameter comparator logic 234 (FIG. 3), compares (block 460, FIG. 5*b*) the appropriate costs of the remaining candidate storage node pool members as a function of the relevant data usage pattern, and the storage node selection logic 210 (FIG. 3) selects (block 464, FIG. 5*b*) the optimal storage node of the remaining candidate storage node pool members for the backup operation.

In one example, the optimal storage node of the remaining candidate storage node pool members P1, P4, Pn for the backup operation directed to the data set D1 (FIG. 4*a*) of the user U1 having a Read usage pattern, may be the storage node having the lowest fees for one or more of the Download Bandwidth, Data Out and Storage costs, such as an average of the fees for the Download Bandwidth, Data Out and Storage costs, for example. Similarly, in another example, the optimal storage node of the remaining candidate storage node pool members P1, P4, Pn for a backup operation directed to the data set D2 (FIG. 4*a*) of the user U1 having a Write usage pattern, may be the storage node having the lowest fees for one or more of the Upload Bandwidth, Data In and Storage costs, such as an average of the fees for the Upload Bandwidth, Data In and Storage costs, for example. In another example, the optimal storage node of the remaining candidate storage node pool members P1, P4, Pn for a backup operation directed to the data set D3 (FIG. 4*a*) of the user U2 having an Even usage pattern, may be the storage node having the lowest fees for one or more of the Download Bandwidth, Upload Bandwidth, Data In, Data Out, and Storage costs, such as an average of the fees for the Download Bandwidth, Upload Bandwidth, Data In, Data Out, and Storage costs, for example.

It is appreciated that user-defined parameters and parameter values other than those described above may be utilized for automated target storage node selection in accordance with the present description. For example, the current location at which a backup has previously been stored for a particular data set or user, may be utilized as a parameter for automated target storage node selection in accordance with the present description. Thus, FIG. 4*a* includes another field designated "Current Backup Location" which identifies the storage node at which the previous backup operation stored the backup data.

Figure 6:
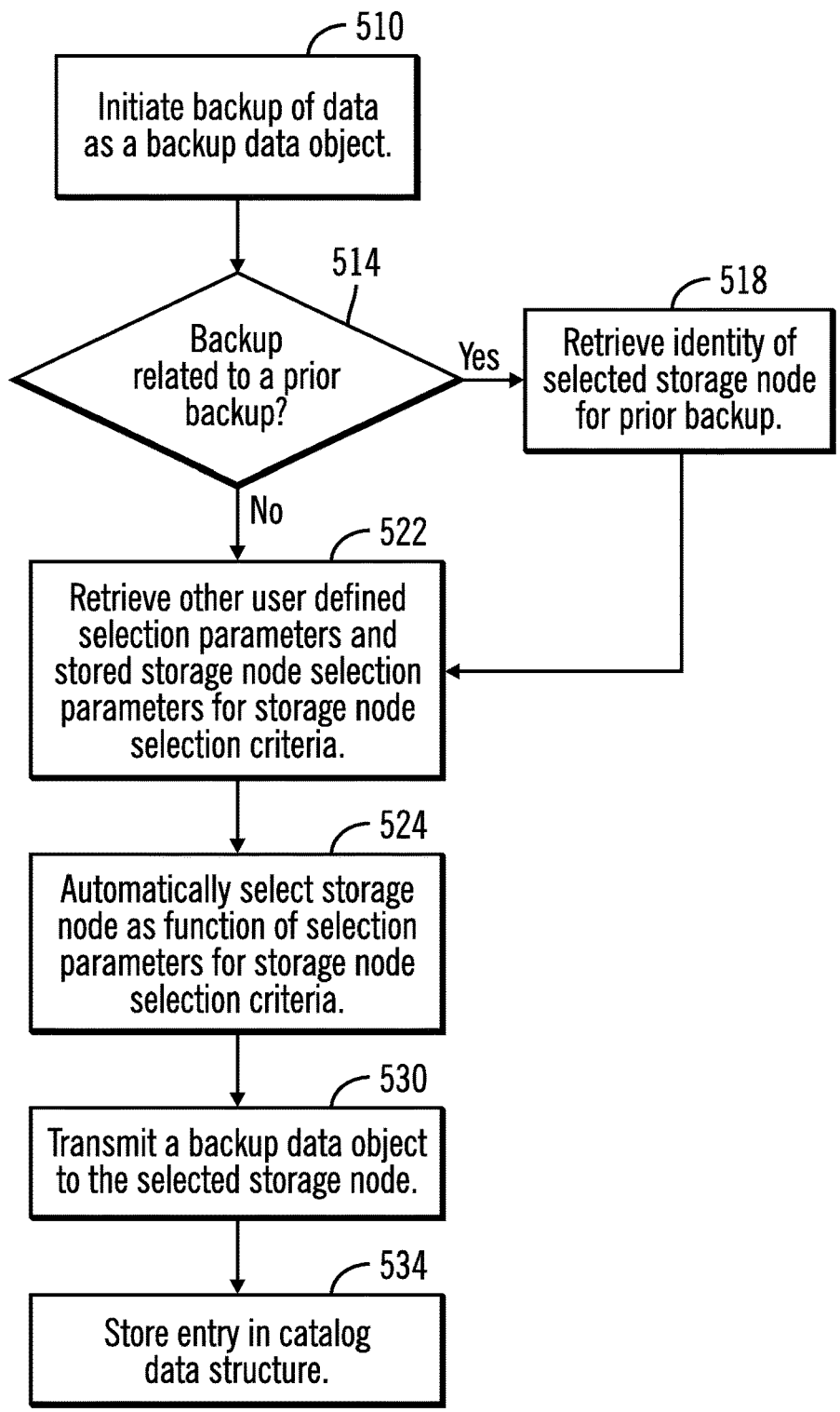
FIG. 6 illustrates yet another embodiment of operations for automated storage target selection in accordance with another aspect of the present description.

FIG. 6 depicts another example of operations of automated target storage selection in accordance with the present description. In the example of FIG. 6, the operations depicted therein are performed by storage node selection logic 210 (FIG. 3) of the backup manager logic 24. In one aspect of the present description, operations depicted in FIG. 6 may be initiated (block 510) in response to the initiation of a backup operation or may be initiated periodically such that after expiration of an interval of time, the operations of FIG. 6 are automatically repeated. In this manner, automated target storage selection in accordance with the present description may be based upon up-to-date parameters of the selection criterion upon which the automated selection is based.

The storage node selection logic 210 (FIG. 3) is configured to determine (block 514, FIG. 6) whether the backup being initiated is related to an earlier backup such as an incremental or differential backup of a previous backup. If so, the identity of the storage location of the previous backup is retrieved (block 518). Thus, in one example, the user-defined parameters for the data set D1 (FIG. 4a) for the user U1 indicates that the current location of data objects for backups of the data set D1 is the storage node P1.

The remaining user-defined and storage node-defined parameters for the backup to be performed are retrieved (block 522, FIG. 6) in a manner similar to that described above. In addition, based upon the retrieved parameters, a storage node is automatically selected (block 524, FIG. 6) in a manner similar to that described above. However, in this embodiment, the selection of the storage node is biased toward selecting the same storage node as previously selected for the related backup operation. However, if factors have changed significantly, the prior selection may be re-evaluated and a different storage node selected if substantial savings may be realized with selection of a different storage node.

A backup data object is transmitted (block 530, FIG. 6) to the selected storage node and an entry is stored (block 534, FIG. 6) in a suitable data structure such as a catalog which catalogs the identity of the storage node at which each data object was stored for each backup operation. In this manner, the location of the backup data may be readily determined in the event that the backup data is to be retrieved for a restore operation, for example.

Figure 7:
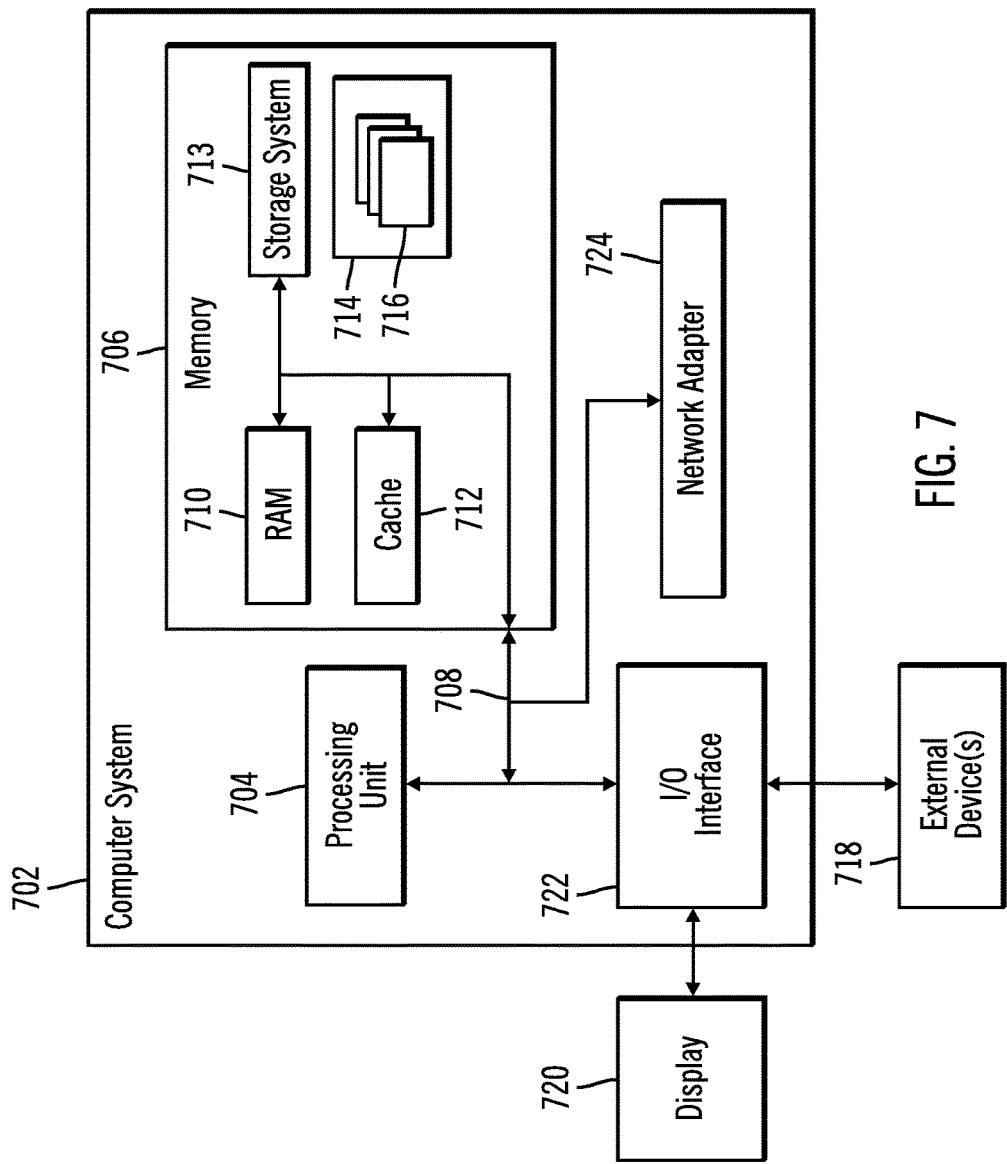
FIG. 7 illustrates a computer embodiment employing automated storage target selection in accordance with the present description.

The computational components of FIGS. 1, 3 and 6 including the hosts 2a, 2b . . . 2n, the storage controller or storage control unit 4 and the cache manager 24, may each be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The system of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   a programmed processor performing automatic backup operations to backup data to a storage node, the automatic backup operations performed by the programmed processor, including:
   storing a plurality of selection criteria including a first user-defined parameter for a first selection criterion and a second user-defined parameter for a second selection criterion broader than the first selection criterion;
   after storing the plurality of selection criteria including the first and second selection criteria, selecting a storage node of a plurality of candidate storage nodes as a function of the plurality of selection criteria, to identify a selected storage node; and
   transmitting a backup data object to the selected storage node;
   wherein the automatic backup operation of selecting a storage node of a plurality of storage nodes as a function of the plurality of selection criteria includes broadening the first selection criterion to the second selection criterion broader than the first selection criterion if no candidate storage node is selected as a function of the plurality of selection criteria which includes the first selection criterion, and selecting a storage node of a plurality of storage nodes as a function of a plurality of selection criteria which includes the second, broader selection criterion.

2. The method of claim 1 wherein the selecting a storage node includes retrieving stored user-defined parameters for selection criteria for selecting a storage node, retrieving storage node-defined parameters for selection criteria, and comparing user-defined parameters and storage node-defined parameters, and selecting a storage node as a function of the comparing.

3. The method of claim 2 wherein comparing user-defined parameters and storage node-defined parameters includes broadening the first user-defined parameter to the second user-defined parameter broader than the first user-defined parameter if no candidate storage nodes have a storage node-defined parameter within the first user-defined parameter.

4. The method of claim 2 wherein retrieving storage node-defined parameters for selection criteria includes at least one of periodically retrieving from each candidate storage node, storage node-defined parameters defined by an associated candidate storage node, and in response to an initiation of a backup operation, retrieving from each candidate storage node, storage node-defined parameters defined by the associated candidate storage node.

5. The method of claim 2 wherein the user-defined parameters include at least one of a security parameter, a retrieval speed parameter, a durability parameter, a usage pattern parameter, and a cost parameter.

6. The method of claim 1, wherein the automatic backup operations performed by the programmed processor further include:
   storing in an entry of a catalog data structure, data identifying each backup data object transmitted to a selected storage node, and data identifying the selected storage node to which the backup data object of the entry was transmitted.

7. The method of claim 6, wherein the selection criteria include:
   determining whether a backup operation to be performed is an incremental backup operation relative to an earlier backup operation already performed, and if so:
   retrieving from the catalog an identity of a selected node to which the backup data object of the earlier backup operation was transmitted;
   wherein the selecting a storage node of a plurality of storage nodes as a function of a plurality of selection criteria includes selecting for the incremental backup operation, a retrieved identity of a selected node to which the backup data object of the earlier backup operation was transmitted.

8. The method of claim 1 wherein the storage node is provided by an online cloud storage service.

9. An apparatus for use with a plurality of storage nodes, comprising:
   backup logic configured to perform automatic backup operations to backup data to a selected storage node as a backup data object, the backup logic including:
   storage node selection logic configured to store a plurality of selection criteria including a first user-defined parameter for a first selection criterion and a second user-defined parameter for a second selection criterion broader than the first selection criterion and after storing the plurality of selection criteria including the first and second selection criteria, automatically select a storage node of a plurality of candidate storage nodes as a function of the plurality of selection criteria, to identify a selected storage node; and wherein the backup logic is further configured to transmit a backup data object to the selected storage node; and wherein the storage node selection logic configured to automatically select a storage node of a plurality of candidate storage nodes as a function of the plurality of selection criteria is further configured to broaden the first selection criterion to the second selection criterion broader than the first selection criterion if no candidate storage node is selected as a function of the plurality of selection criteria which includes the first selection criterion, and to select a storage node of a plurality of storage nodes as a function of a plurality of selection criteria which includes the second, broader selection criterion.

10. The apparatus of claim 9 wherein the backup logic further includes user-defined parameter retrieval logic configured to retrieve stored user-defined parameters for selection criteria for selecting a storage node, and storage node-defined parameter retrieval logic configured to retrieve storage node-defined parameters for selection criteria, wherein the storage node selection logic is further configured to compare user-defined parameters and storage node-defined parameters, and select a storage node as a function of the comparison.

11. The apparatus of claim 10 wherein the storage node selection logic is further configured to broaden the first user-defined parameter to the second user-defined parameter broader than the first user-defined parameter if no candidate storage nodes have a storage node-defined parameter within the first user-defined parameter.

12. The apparatus of claim 10 wherein the storage node-defined parameter retrieval logic is further configured to at least one of periodically retrieve from each candidate storage node, storage node-defined parameters defined by an associated candidate storage node, and in response to an initiation of a backup operation, retrieving from each candidate storage node, storage node-defined parameters defined by an associated candidate storage node.

13. The apparatus of claim 10 wherein the user-defined parameters include at least one of a security parameter, a retrieval speed parameter, a durability parameter, a usage pattern parameter, and a cost parameter.

14. The apparatus of claim 9, wherein the backup logic further includes:
backup data object catalog logic having a catalog data structure having a plurality of entries, the backup data object catalog logic configured to store in an entry of the catalog data structure, data identifying a backup data object transmitted to a selected storage node, and data identifying the selected storage node to which the backup data object of the entry was transmitted.

15. The apparatus of claim 14, wherein the backup logic is further configured to:
determine whether a backup operation to be performed is an incremental backup operation relative to an earlier backup operation already performed, and if so:
retrieve from the catalog an identity of a selected node to which the backup data object of the earlier backup operation was transmitted;
wherein the storage node selection logic is further configured to select for the incremental backup operation, a retrieved identity of a selected node to which the backup data object of the earlier backup operation was transmitted.

16. The apparatus of claim 9 wherein the storage node is provided by an online cloud storage service.

17. A computer program product for use with a computer system and a plurality of storage nodes of a network, wherein the computer program product comprises a computer readable storage medium having program instructions embodied therewith, the program instructions executable by a processor of the computer system to cause processor operations, the processor operations comprising:
performing automatic backup operations to backup data to a storage node, the automatic backup operations including:
storing a plurality of selection criteria including a first user-defined parameter for a first selection criterion and a second user-defined parameter for a second selection criterion broader than the first selection criterion;
after storing the plurality of selection criteria including the first and second selection criteria, selecting a storage node of a plurality of candidate storage nodes as a function of the plurality of selection criteria, to identify a selected storage node; and
transmitting a backup data object to the selected storage node;
wherein the automatic backup operation of selecting a storage node of a plurality of storage nodes as a function of the plurality of selection criteria includes broadening the first selection criterion to the second selection criterion broader than the first selection criterion if no candidate storage node is selected as a function of the plurality of selection criteria which includes the first selection criterion, and selecting a storage node of a plurality of storage nodes as a function of a plurality of selection criteria which includes the second, broader selection criterion.

18. The computer program product of claim 17 wherein the selecting a storage node includes retrieving stored user-defined parameters for selection criteria for selecting a storage node, retrieving storage node-defined parameters for selection criteria, and comparing user-defined parameters and storage node-defined parameters, and selecting a storage node as a function of the comparing.

19. The computer program product of claim 18 wherein comparing user-defined parameters and storage node-defined parameters includes broadening the first user-defined parameter to the second user-defined parameter broader than the first user-defined parameter if no candidate storage nodes have a storage node-defined parameter within the first user-defined parameter.

20. The computer program product of claim 18 wherein retrieving storage node-defined parameters for selection criteria includes at least one of periodically retrieving from each candidate storage node, storage node-defined parameters defined by an associated candidate storage node, and in response to an initiation of a backup operation, retrieving from each candidate storage node, storage node-defined parameters defined by the associated candidate storage node.

21. The computer program product of claim 18 wherein the user-defined parameters include at least one of a security parameter, a retrieval speed parameter, a durability parameter, a usage pattern parameter, and a cost parameter.

22. The computer program product of claim 17, wherein the automatic backup operations performed by the processor further include:
storing in an entry of a catalog data structure, data identifying each backup data object transmitted to a selected storage node, and data identifying the selected storage node to which the backup data object of the entry was transmitted.

23. The computer program product of claim 22, wherein the selection criteria include:
   determining whether a backup operation to be performed is an incremental backup operation relative to an earlier backup operation already performed, and if so:
   retrieving from the catalog an identity of a selected node to which the backup data object of the earlier backup operation was transmitted;
   wherein the selecting a storage node of a plurality of storage nodes as a function of a plurality of selection criteria includes selecting for the incremental backup operation, a retrieved identity of a selected node to which the backup data object of the earlier backup operation was transmitted.

24. The computer program product of claim 17 wherein the storage node is provided by an online cloud storage service.

\* \* \* \* \*